United States Patent [19]

Pittet et al.

[11] Patent Number: 4,571,343

[45] Date of Patent: Feb. 18, 1986

[54] FLAVORING WITH ORTHO-DIOXYBENZALDEHYDE DIMETHYL MERCAPTALS

[75] Inventors: Alan O. Pittet, Atlantic Highlands; Ranya Muralidhara, Fair Haven; Manfred H. Vock, Locust; Kevin P. Miller, Middletown; Domenick Luccarelli, Jr., Neptune, all of N.J.

[73] Assignee: International Flavors & Fragrances Inc., New York, N.Y.

[21] Appl. No.: 729,237

[22] Filed: May 1, 1985

[51] Int. Cl.$^4$ .............................................. A23L 1/226
[52] U.S. Cl. ...................................... 426/535; 568/45
[58] Field of Search .......................... 426/535; 568/45

[56] References Cited

U.S. PATENT DOCUMENTS 4,464,408  8/1984  Pittet et al. .......................... 426/535
4,504,508  3/1985  Pittet et al. .......................... 426/535

Primary Examiner—Joseph Golian
Attorney, Agent, or Firm—Arthur L. Liberman

[57] ABSTRACT

Described are the ortho-dioxybenzaldehyde dimethyl mercaptals having the structure:

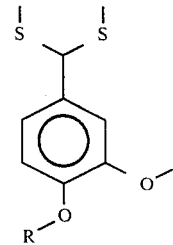

wherein R represents hydrogen or methyl and the use thereof in augmenting or enhancing the aroma or taste of foodstuffs.

3 Claims, 2 Drawing Figures

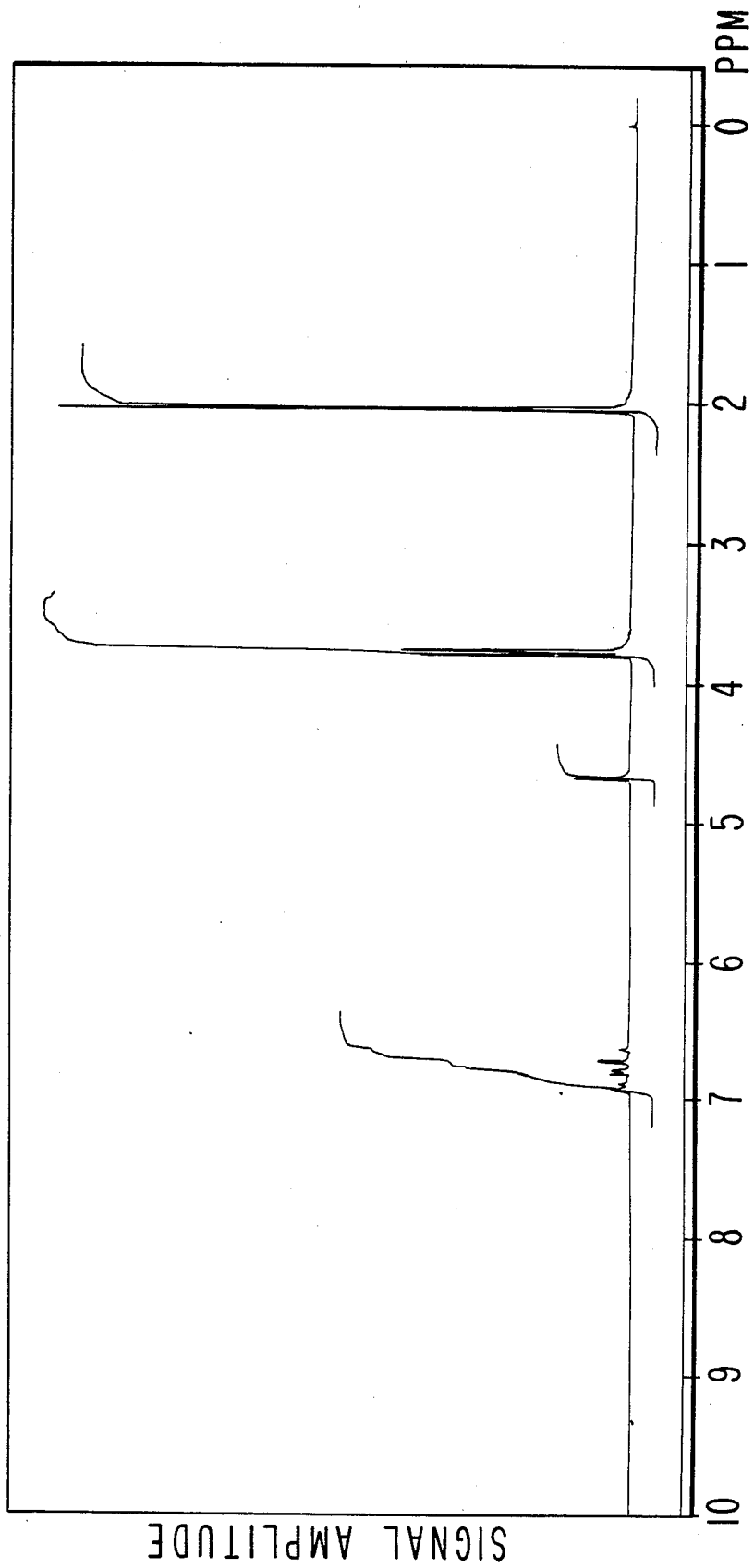

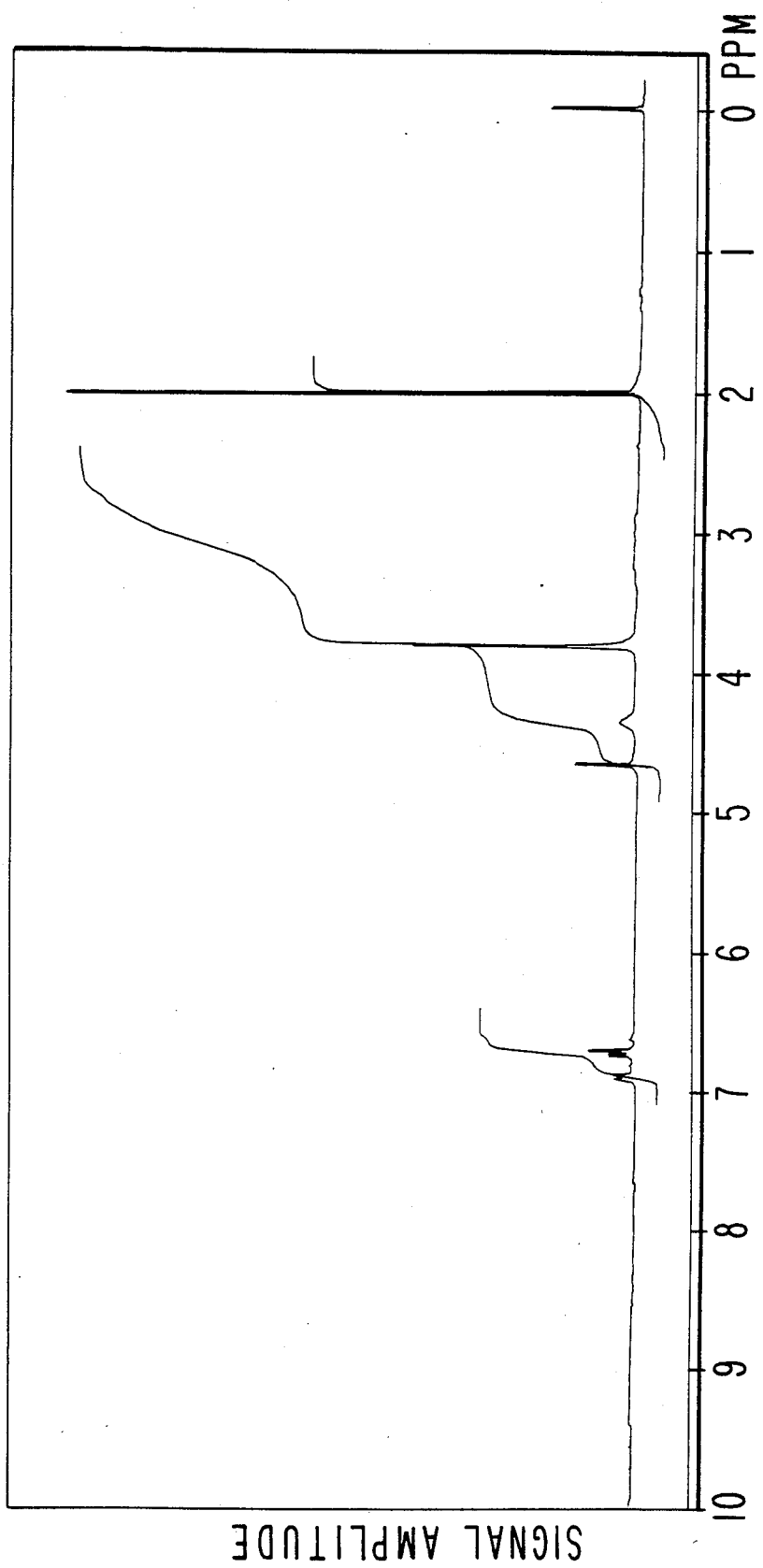

FLAVORING WITH ORTHO-DIOXYBENZALDEHYDE DIMETHYL MERCAPTALS

BACKGROUND OF THE INVENTION

This invention relates to the novel ortho-dioxybenzaldehyde dimethyl mercaptals defined according to the structure:

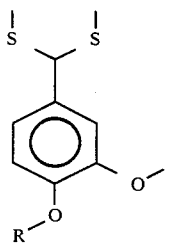

wherein R represents hydrogen or methyl and the use thereof in augmenting or enhancing the aroma or taste of foodstuffs.

Artificial flavoring agents for foodstuffs have received increasing attention in recent years. In many areas, such food flavoring agents are preferred over natural flavoring agents at least in part because of the uniform flavor that may be so obtained. For example, natural food flavoring agents, such as extracts, essences, concentrates and the like are often subject to wide variation due to changes in the quality, type and treatment of the raw materials. Such variation can be reflected in the end product and results in unreliable flavor characteristics and uncertainty as to consumer acceptance and cost. Additionally, the presence of the natural product in the ultimate food may be undesirable because of increased tendency to spoil. This is particularly troublesome in convenience and snack food usage where such products as dips, soups, chips, prepared dinners, canned foods, sauces, gravies and the like are apt to be stored by the consumer for some time prior to use.

The fundamental problem in preparing artificial flavoring agents is that of achieving as nearly as possible a true flavor reproduction. This generally proves to be a difficult task since the mechanism for flavoring development in many foods is not understood. This is notable in products having mushroom, hydrolyzed vegetable protein-like and cabbage-like aroma nuances and mushroom, hydrolyzed vegetable protein-like, meat extract and sweet cabbage taste nuances.

Reproduction of mushroom, hydrolyzed vegetable protein, cabbage and vanilla aromas and mushroom, hydrolyzed vegetable protein-like, meat extract, cabbage and sweet vanilla taste nuances has been the subject of long and continuous searches by those engaged in the production of foodstuffs. The severe shortage of foods, especially protein foods, in many parts of the world has given rise to the need for utilizing non-meat sources of proteins and making such proteins as palatable and as meat-like as possible. Hence, materials which will closely simulate or exactly produce the flavor and aroma of such materials as meat flavored foodstuffs and hydrolyzed vegetable protein flavored foodstuffs as well as mushroom flavored foodstuffs are required.

Moreover, there are a great many meat containing or meat based foods presently distributed in a preserved form. Examples of such substances are condensed soups, dry soup mixes, dry meat, freeze dried or lyophilized meats, packaged gravies and the like. While these products contain meat or meat extracts, the aroma, taste and other organoleptic factors are very often impaired by the processing operation and it is desirable to supplement or enhance the flavors of these preserved foods with versatile materials which has mushroom, hydrolyzed vegetable protein, meat extract and sweet cabbage aroma and taste nuances.

Furthermore, there is a need for pet foods (e.g., dog foods and cat foods) which have hydrolyzed vegetable protein-like and meat extract-like aromas and tastes. There are a great many pet foods presently distributed in a preserved form. Examples of such are dry meat, freeze dried or lyophilized meats, packaged gravies and the like. While these products contain meat or meat extracts, they also contain additional proteinaceous materials and the fragrance, taste and other organoleptic factors are very often impaired by the processing operation and by the presence of selected proteinaceous materials. It is thus desirable to supplement or enhance the flavors of these pet foods which are preserved with versatile materials which have mushroom, hydrolyzed vegetable protein-like, meat extract and sweet cabbage-like aroma and taste nuances.

2-(2,6-dimethyl-1,5-heptadienyl)-1,3-dithiolanes defined according to the generic structure:

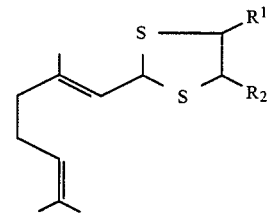

wherein $R_1$ and $R_2$ are the same or different and each represents methyl or hydrogen with the proviso that at least one of $R_1$ and $R_2$ is methyl and uses thereof in augmenting or enhancing the aroma of meat flavored foodstuffs are disclosed in U.S. Pat. No. 4,464,408 issued on Aug. 7, 1984.

Nothing in the prior art, however, discloses or implies the ortho-dioxybenzaldehyde dimethyl mercaptals of our invention or the use of such ortho-dioxybenzaldehyde dimethyl mercaptals for their organoleptic properties in augmenting or enhancing the aroma or taste of foodstuffs.

BRIEF DESCRIPTION OF THE DRAWINGS

FIG. 1 is the NMR spectrum for the compound having the structure:

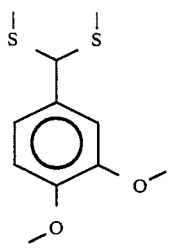

prepared according to Example I (Conditions: Field strength: 100 MHz; solvent: CFCl₃).

FIG. 2 is the NMR spectrum for the compound having the structure:

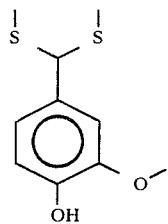

prepared according to Example II (Conditions: Field strength: 100 MHz; solvent: CFCl₃).

THE INVENTION

The present invention provides the novel ortho-dioxybenzaldehyde dimethyl mercaptals defined according to the generic structure:

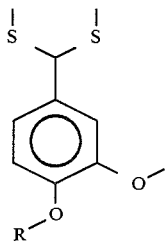

wherein R represents hydrogen or methyl as well as methods for augmenting or enhancing or modifying the organoleptic properties e.g., the taste and aroma of foodstuffs.

The ortho-dioxybenzaldehyde dimethyl mercaptals of our invention augment or enhance mushroom, hydrolyzed vegetable protein, cabbage-like and vanilla aroma nuances and mushroom-like, hydrolyzed vegetable protein-like, meat extract-like, cabbage-like and sweet taste nuances in foodstuffs.

The ortho-dioxybenzaldehyde dimethyl mercaptals of our invention defined according to the generic structure:

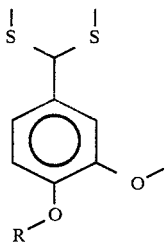

wherein R represents methyl or hydrogen may be produced by means of reacting an aldehyde defined according to the structure:

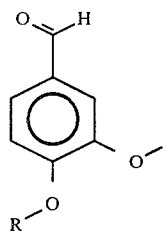

wherein R represents methyl or hydrogen with methyl mercaptan in the presence of a protonic acid catalyst such as para-toluene-sulfonic acid, xylene sulfonic acid, methane sulfonic acid, phosphoric acid and concentrated phosphoric acid. The reaction takes place at a temperature in the range of from about 0° C. up to about 10° C. and in the presence of an inert solvent such as cyclohexane or methylene dichloride. The reaction is carried out by bubbling or sparging methyl mercaptan into a reaction mass containing the protonic acid catalyst, the inert solvent and the aldehyde having the structure:

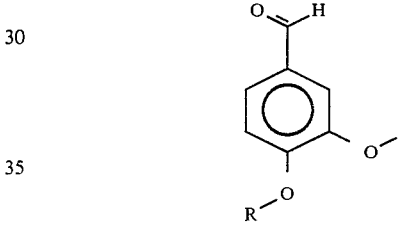

wherein R represents hydrogen or methyl for a period of between about 4 and about 12 hours. At the end of the reaction, the reaction mass is "worked up" by means of (i) neutralizing the acid catalyst; (ii) washing the reaction mass with a saline solution; (iii) stripping off the solvent; (iv) drying the reaction mass using an anhydrous drying agent such as anhydrous sodium sulfate; and finally (v) fractionally distilling the reaction product using a fractionation column.

The reaction of our invention may be shown thusly:

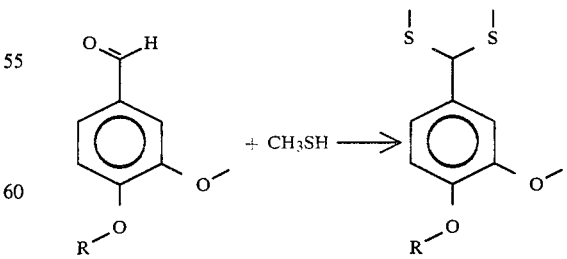

wherein R represents hydrogen or methyl.

The two examples of the reaction products of our invention and their organoleptic properties are as follows:

TABLE I

| STRUCTURE OF REACTION PRODUCT | ORGANOLEPTIC PROPERTIES |
|---|---|
| The compound having the structure: 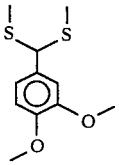 | A mushroom and hydrolyzed vegetable protein-like aroma and a mushroom, hydrolyzed vegetable protein-like and meat extract-like taste profile at 2 ppm causing it to be useful in hydrolyzed vegetable protein flavored foodstuffs and mushroom gravies. |
| The compound having the structure: 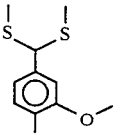 prepared according to Example II | A cabbage, vanilla and hydrolyzed vegetable protein-like aroma profile and a cabbage, sweet, vanilla, meat extract-like and hydrolyzed vegetable protein-like taste profile at 3 ppm causing it to be useful in hydrolyzed vegetable protein flavored foodstuffs, vanilla extracts, vanilla flavored foodstuffs and meat flavored foodstuffs. |

Thus, the ortho-dioxybenzaldehyde dimethyl mercaptals of our invention produced according to the process of our invention can be used to alter, vary, fortify, modify, enhance or otherwise improve the organoleptic properties, including flavor and/or aroma, of a wide variety of materials which are ingested, consumed or otherwise organoleptically sensed.

The term "alter" in its various forms will be understood herein to mean the supplying or imparting a flavor character or note to an otherwise bland, relatively tasteless substance, or augmenting an existing flavor characteristic where the natural flavor is deficient in some regard, or supplementing the existing flavor or aroma impression to modify the organoleptic character. The materials which are so altered are generally referred to herein as consumable materials.

Such ortho-dioxybenzaldehyde dimethyl mercaptals of our invention are accordingly useful in flavoring compositions. Flavoring compositions are herein taken to mean those which contribute a part of the overall flavor impression by supplementing or fortifying a natural or artificial flavor in a material, as well as those which supply substantially all the flavor and/or aroma character to a consumable article.

The term "foodstuff" as used herein includes both solid and liquid ingestible materials for main or animals, which materials usually do, but need not, have nutritional value. Thus, foodstufs includes meats, gravies, soups, convenience foods, malt and alcoholic or non-alcoholic beverages, milk and dairy products, nut butters such as peanut butter and other spreads, seafoods including fish, crustaceans, mollusks and the like, candies, breakfast foods, baked goods, vegetables, cereals, soft drinks, snack foods, dog and cat foods, other veterinary products, and the like.

When the ortho-dioxybenzaldehyde diemthyl mercaptals, according to this invention, are used in a food flavoring composition, they can be combined with conventional flavoring materials or adjuvants. Such co-ingredients or flavoring adjuvants are well known in the art for such use and have been extensively described in the literature. Apart from the requirement that any such adjuvant material is ingestibly acceptable, and thus non-toxic or otherwise non-deleterious, conventional materials can be used and broadly include other flavor materials, vehicles, stabilizers, thickeners, surface active agents, conditioners and flavor intensifiers.

Examples of preferred co-flavoring adjuvants are:
Methyl thiazole alcohol (4-methyl-5-betahydroxyethyl thiazole);
2-Methyl butanethiol;
4-Mercapto-2-butanone;
3-Mercapto-2-pentanone;
1-Mercapto-2-propanone;
Benzaldehyde;
Furfural;
Furfuryl alcohol;
2-Mercapto propionic acid;
Alkyl pyrazine;
Methyl pyrazine;
2-Ethyl-3-methyl pyrazine;
Tetramethyl pyrazine;
Polysulfides;
Dipropyl disulfide;
Methyl benzyl disulfide;
Alkyl thiophenes;
2-Butyl thiophene;
2,3-Dimethyl thiophene;
5-Methyl furfural;
Acetyl fuan;
2,4-Decadienal;
Guiacol;
Phenyl acetaldehyde;
δ-Decalactone;
d-Limonene;
Acetoin;
Amyl acetate;
Maltol;
Ethyl butyrate;
Levulinic acid;
Piperonal;
Ethyl acetate;
n-Octanal;
n-Pentanal;
Hexanal;
Diacetyl;
Monosodium glutamate;
Monopotassium glutamate;
Sulphur-containing amino acids, e.g., cysteine;
Hydrolyzed vegetable protein;
2-Methylfuran-3-thiol;
2-Methyldihydrofuran-3-thiol;
Hydrolyzed fish protein; and
Tetramethyl pyrazine.

The ortho-dioxybenzaldehyde dimethyl mercaptals or the compositions incorporating them, as mentioned above, can be combined with one or more vehicles or carriers for adding them to the particular product. Vehicles can be edible or otherwise suitable materials such as ethyl alcohol, propylene glycol, water and the like. Carriers include materials such as gum arabic, carrageenan, other gums and the like. The ortho-dioxybenzaldehyde dimethyl mercaptals according to this invention can be incorporated with the carriers by conventional means such as spray-drying, drum drying and the like. Such carriers can also include materials for coacervating the ortho-dioxybenzaldehyde dimethyl mercaptals (and other flavoring ingredients, as present) to provide encapsulated products. When the carrier is an emulsion, the flavoring composition can also contain emulsifiers such as mono- and diglycerides or fatty acids and the like. With these carriers or vehicles, the desired physical form of the composition can be prepared.

The quantity of ortho-dioxybenzaldehyde dimethyl mercaptals utilized should be sufficient to impart the desired flavor characteristic to the product, but on the other hand, the use of an excessive amount of the derivative is not only wasteful and uneconomical, but in some instances too large a quantity may unbalance the flavor or other organoleptic properties of the product consumed. The quantity used will vary depending upon the ultimate foodstuff; the amount and type of flavor initially present in the foodstuff; the further process or treatment steps to which the foodstuff will be subjected; regional and other preference factors; the type of storage, if any, to which the product will be subject; and the preconsumption treatment, such as baking, frying, and so on, given to the product by the ultimate consumer. Accordingly, the terminology "effective amount" and "sufficient amount" is understood in the context of the present invention to be quantitatively adequate to alter the flavor of the foodstuff.

It is accordingly preferred that the ultimate composition contain from about 0.1 parts per million up to about 250 parts per million of ortho-dioxybenzaldehyde dimethyl mercaptals or mixtures thereof. More particularly, in food compositions it is desirable to use from about 0.1 to 100 parts per million for enhancing flavors and in certain preferred embodiments of the invention, from about 0.1 to about 10 parts per million of the ortho-dioxybenzaldehyde dimethyl mercaptals are included to add positive flavors to the finished product.

The amount of ortho-dioxybenzaldehyde dimethyl mercaptals or mixtures thereof of our invention to be utilized in flavoring compositions can be varied over a wide range depending upon the particular quality to be added to the foodstuff. Thus, amounts of one or more derivatives according to the present invention of from about 0.5 ppm up to 80 or 90% of the total flavoring composition can be incorporated in such compositions. It is generally found to be desirable to include from about 1 ppm up to about 0.1% of the ortho-dioxybenzaldehyde dimethyl mercaptals in such compositions.

The following examples are given to illustrate embodiments of the invention as it is preferred to practice it. It will be understood that these examples are illustrative and the invention is not to be considered restricted thereto except as indicated in the appended claims.

All parts, proportions, percentages and ratios used herein are by weight unless otherwise indicated.

EXAMPLE I

PREPARATION OF THE DIMETHYL MERCAPTAL OF VERATRALDEHYDE

Reaction:

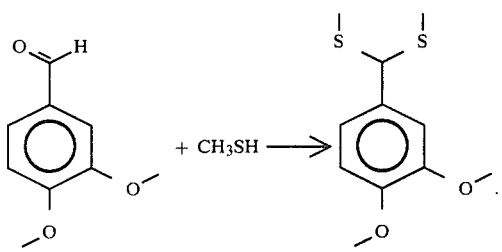

Into a 500 cc reaction vessel equipped with stirrer, thermometer, cooling bath and gas bubbling tube are placed 200 ml methylene dichloride; 0.5 grams para-toluene sulfonic acid and 16.6 grams of veratraldehyde having the structure:

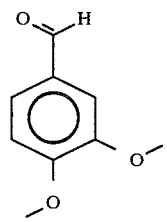

The resulting mixture is cooled to 0° C. and over a period of eight hours, 15 grams of methyl mercaptan is sparged into the reaction mass.

At the end of the eight hour period, the reaction mass is washed with an equal volume of 10% aqueous sodium carbonate followed by an equal volume of 10% aqueous sodium chloride solution. The reaction mass is then stripped of solvent and fractionally distilled yielding the compound having the structure:

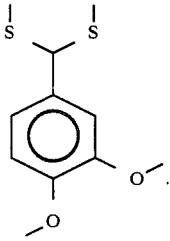

FIG. 1 is the NMR spectrum for the compound having the structure:

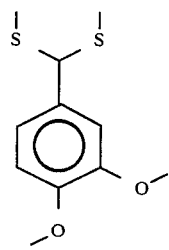

(Conditions: Field strength: 100 MHz; solvent: CFCl₃).

The compound having the structure:

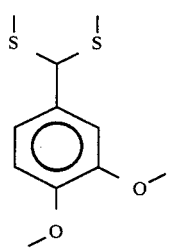

has an excellent aesthetically pleasing mushroom-like and hydrolyzed vegetable protein-like aroma profile and a mushroom-like, hydrolyzed vegetable protein-like and meat extract-like taste profile at 2 ppm causing it to be useful in hydrolyzed vegetable protein flavored foodstuffs and mushroom gravies.

EXAMPLE II

PREPARATION OF THE DIMETHYL MERCAPTAL OF VANILLIN

Reaction:

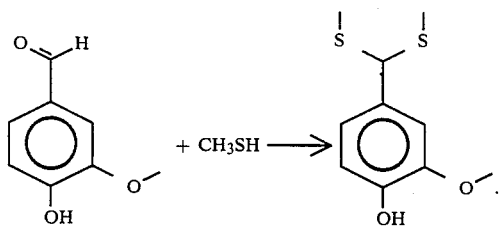

Into a 500 ml reaction flask equipped with electric stirrer, cooling bath, reflux condenser and thermometer is placed 30.4 grams of vanillin dissolved in glacial acetic acid; and 200 ml methylene dichloride; and 0.5 grams para-toluene sulfonic acid. The reaction mass is cooled to 0° C. and over a period of ten hours, 24 grams of methyl mercaptan is sparged into the reaction mass. At the end of the ten hour period, the reaction mass is washed with one equal volume of 10% aqueous sodium carbonate followed by an equal volume of 10% aqueous sodium chloride solution. The reaction mass is then dried over anhydrous sodium sulfate, stripped of solvent and fractionally distilled yielding the compound having the structure:

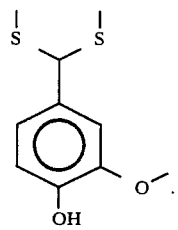

FIG. 2 is the NMR spectrum for the compound having the structure:

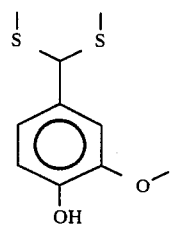

(Conditions: Field strength: 100 MHz; solvent: CFCl₃).

The compound having the structure:

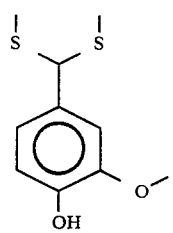

has an intense, aesthetically pleasing, cabbage-like, vanilla-like and hydrolyzed vegetable protein-like aroma profile and a cabbage-like, sweet, vanilla, meat extract-like, hydrolyzed vegetable protein-like taste profile at 3 ppm causing it to be useful in vanilla extract compositions, vanilla flavored foodstuffs and meat flavored foodstuffs.

EXAMPLE III

A meat gravy is prepared containing 2 ppm by weight of the compound having the structure:

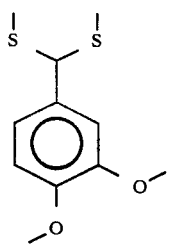

prepared according to Example I using a beef base and beef fat. The resulting beef gravy containing the compound having the structure:

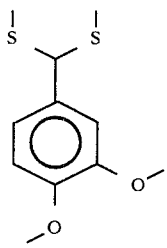

is then added to mushrooms cooked using boiling water at a rate of 10 parts gravy to 100 parts cooked mushrooms. The resulting mushroom platter has an excellent natural-like, meat extract-like, mushroom flavor.

When the compound having the structure:

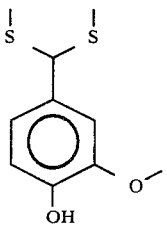

is added to this platter (which already contains the compound having the structure:

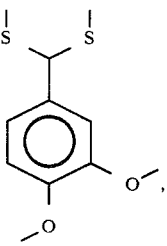

at a level of 3 ppm an intense sweet cabbage-like aroma and taste nuance is added to the resulting product.

EXAMPLE IV

The compound having the structure:

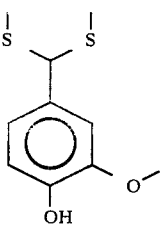

prepared according to Example II is dissolved in propylene glycol to provide a 0.1% solution. The solution in the amount of 0.9 grams is added to 7.3 grams of a soup base consisting of:

| INGREDIENT | PARTS BY WEIGHT |
|---|---|
| Fine ground sodium chloride | 35.5 |
| Hydrolyzed vegetable protein | 27.5 |
| Monosodium glutamate | 18.0 |
| Sucrose | 11.0 |
| Beef fat | 5.5 |
| Sethness caramel color (powder B & C) | 2.7 |

The resulting mixture has an intense mushroom and hydrolyzed vegetable protein-like aroma profile with a mushroom-like, hydrolyzed vegetable protein and meat extract-like taste profile.

What is claimed is:

1. A process for augmenting or enhancing the aroma or taste of a foodstuff comprising the step of adding to said foodstuff from 0.1 parts per million up to about 250 parts per million by weight of said foodstuff of at least one ortho-dioxybenzaldehyde dimethyl mercaptal defined according to the structure:

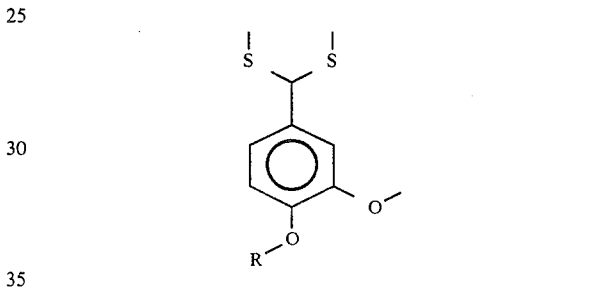

wherein R represents hydrogen or methyl.

2. The process of claim 1 wherein the ortho-dioxybenzaldehyde dimethyl mercaptal has the structure:

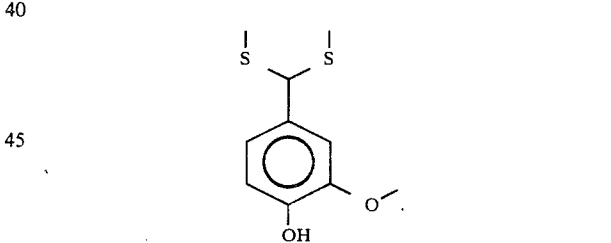

3. The process of claim 1 wherein the ortho-dioxybenzaldehyde dimethyl mercaptal has the structure:

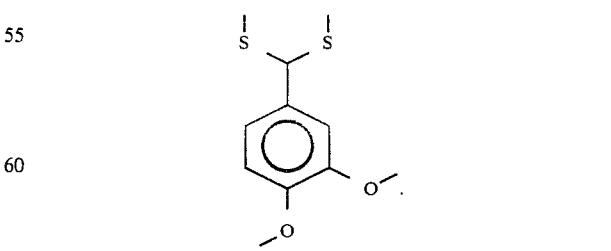

* * * * *